United States Patent [19]

Grundmann

[11] Patent Number: 4,459,386

[45] Date of Patent: Jul. 10, 1984

[54] PROCESS FOR THE PRODUCTION OF POLYACRYLONITRILEPOLYPHOS-PHONIC ACID AND ITS USE AS A FLAME RETARDANT

[75] Inventor: Raban Grundmann, Marl, Fed. Rep. of Germany

[73] Assignee: Chemische Werke Huels Aktiengesellschaft, Marl, Fed. Rep. of Germany

[21] Appl. No.: 449,712

[22] Filed: Dec. 14, 1982

[30] Foreign Application Priority Data

Dec. 14, 1981 [DE] Fed. Rep. of Germany ....... 3149454

[51] Int. Cl.$^3$ ................................................ C08F 8/40
[52] U.S. Cl. ..................................... 525/157; 525/158; 525/164; 525/206; 525/233; 525/329.1; 525/329.2; 525/340
[58] Field of Search ................... 525/340, 329.1, 329.2, 525/157, 158, 164, 206, 233

[56] References Cited

U.S. PATENT DOCUMENTS

| 2,510,090 | 6/1950 | Di Masi | 525/340 |
|---|---|---|---|
| 2,579,451 | 12/1951 | Polson | 525/340 |
| 3,544,262 | 12/1970 | Harris et al. | 525/340 |
| 3,936,416 | 2/1976 | Brady | 260/42.18 |
| 3,993,635 | 11/1976 | Mango | 525/340 |
| 4,013,599 | 3/1977 | Strauss et al. | 260/17.3 |
| 4,067,927 | 1/1978 | Werl | 525/340 |
| 4,198,493 | 4/1980 | Marciandi | 525/164 |
| 4,207,405 | 6/1980 | Masler et al. | 525/340 |
| 4,255,540 | 3/1981 | Weiss | 525/340 |
| 4,286,076 | 8/1981 | David et al. | 525/340 |
| 4,369,260 | 1/1983 | Younes | 525/340 |
| 4,379,877 | 4/1983 | Younes | 525/340 |

FOREIGN PATENT DOCUMENTS 1074243 7/1967 United Kingdom .
1530856 11/1978 United Kingdom .

Primary Examiner—Joseph L. Schofer
Assistant Examiner—Bernard Lipman
Attorney, Agent, or Firm—Millen & White

[57] ABSTRACT

For the production of acrylonitrile polymers containing phosphonic acid groups and having phosphorus contents of 1–17% by weight, homo- or copolymers of acrylonitrile having molecular weights of 1,000–200,000 are reacted at temperatures of 120°–220° C. with 0.2–8 moles of phosphorous acid per mole of nitrile group. Preferably, a melt is prepared from phosphorous acid, and the acrylonitrile polymer is added thereto in metered quantities.

20 Claims, No Drawings

PROCESS FOR THE PRODUCTION OF POLYACRYLONITRILEPOLYPHOSPHONIC ACID AND ITS USE AS A FLAME RETARDANT

BACKGROUND OF THE INVENTION

The present invention relates to a process for the production of novel polymeric phosphonic acids based on acrylonitrile polymers and their use as flame retardants in synthetic resins and intumescent coating compositions, e.g., paints.

The manufacture of halogen-free flame retardant combinations is conventional. These use phosphates and polyphosphates (U.S. Pat. No. 3,936,416; DOS 2,839,710=British Pat. No. 2,006,223=U.S. Pat. No. 4,198,493) or phosphonic acids (DOS 2,827,867=European Pat. No. 6,568), optionally in blends with nitrogen compounds and hydroxy compounds. When exposed to flame, these intumescent flame retardants form a fire resistant coke foam on the polymer, thereby shielding the remainder of the material from further effects of fire and heat and contributing toward extinction of the polymer fire. Many flame retardant coating compositions are based on the same fire resistance principle (DOS No. 1,794,343=Canadian Pat. No. 822,594=British Pat. No. 1,074,243, DOS 2,315,416=U.S. Pat. No. 4,013,599).

All of these compositions have the disadvantage that they are unstable with respect to the effects of water and are extracted by water (J. Fire Retard. Chem. 4:154, No. 3 [1977]).

SUMMARY OF THE INVENTION

Accordingly, it is an object of this invention to provide improved halogen-free, water resistant flame retardants.

Upon further study of the specification and appended claims, further objects and advantages of this invention will become apparent to those skilled in the art.

These objects have been attained by providing a process for producing a polyacrylonitrile-polyphosphonic acid with phosphorus contents of 1-17% by weight, comprising reacting homo- or copolymers of acrylonitrile of molecular weights of 1,000-200,000 at temperatures of 120°-220° C. with 0.2-8 moles of phosphorous acid per mole of nitrile group in the polymers, and, subsequently, removing the unreacted phosphorous acid from the reaction product by dissolution in water.

DETAILED DISCUSSION

DOS No. 2,626,767=British Patent 1,530,856=Canadian Pat. No. 1,077,518 discloses a method for the addition of phosphorous acid to carboxylic acid nitriles of 1-12 carbon atoms thereby forming amino alkyl diphosphonic acids. In the examples thereof, the preferred reactions are those of nitriles of a lower alkyl residue, (e.g., acetonitrile, propionitrile).

It has been found, surprisingly, that the reaction of polyacrylonitrile with a melt of phosphorous acid is possible and even takes place with a strongly exothermic reaction. If relatively large amounts of polyacrylonitrile and phosphorous acid are heated to 160°-180° C., a temperature rise occurs to above 300° C., together with spontaneous ignition. With an adequate metering of the reactants, however, the reaction is readily controllable. The reaction product is hardly soluble in water (e.g., solubilities of 0.1-5 g/l) and has a content of up to 17% of chemically bound phosphorous (P-atom) after thorough washing out of any excess phosphorous acid.

Suitable acrylonitrile polymers include the homo- and copolymers of acrylonitrile. Suitable comonomers include, besides acrylic acid, an acrylic acid ester, acrylamide, vinyl acetate, vinyl ether, styrene, butadiene, butene, vinyl chloride, or vinylidene chloride and the like. The polymers generally contain at least 20 mole % of acrylonitrile, i.e., the monomer mix generally contains at least about 20 mole % of acrylonitrile monomer, usually more than 80 mole %. These polymers can be produced according to fully conventional methods, preferably by free radical or anionic polymerization: see, e.g., Ullmanns Encykl. d. techn. Chemie, 3. ed. (1963), vol. 14, p. 276-280 whose disclosure is incorporated by reference herein. They generally have molecular weights of 1,000-200,000, preferably 10,000-100,000, measured by dispersion of light.

Per mole of nitrile groups in the polymer, 0.2-8 moles of $H_3PO_3$, preferably 2-4 moles of $H_3PO_3$ is utilized. Most preferably, anhydrous $H_3PO_3$ having a melting point of 65°-70° C. is used, but technical products of lower purity can also be employed. Nitrile group contents can be determined by any conventional method, e.g., by saponification in an alkaline medium, in connection with an elementary analysis, or can be based on theory in view of the ratio of monomers employed.

It is also possible to recycle excess $H_3PO_3$, obtained after the reaction to form polyacrylonitrilepolyphosphonic acid as an aqueous solution during the working-up operation, into the reaction after separation of the water, or to use such excess $H_3PO_3$ for additional batches.

The reaction can be accelerated by catalysts. Examples of suitable catalysts include $AlCl_3$, $ZnCl_2$, LiBr, $H_3PO_4$ and the like. The catalysts are generally utilized in amounts from 0.05 to 5% by weight, based on the amount of polyacrylonitrile. Typical total reaction times are about 2-8 hours.

The addition products of polyacrylonitrile and phosphorous acid can be produced in an especially advantageous fashion by adding to the melt of anhydrous $H_3PO_3$ metered amounts of acrylonitrile polymer at temperatures of 120°-220° C., especially 160°-190° C. Care must be taken that the thus-added compound reacts quickly before introducing further amounts of the acrylonitrile polymer. Typical metering rates will be 0.05-0.5 moles/h/mole of $H_3PO_3$ depending on the temperature and will be chosen to ensure that the reaction temperature does not exceed 220° C. and that an exothermic reaction ensues.

The use of solvents, such as for example, dimethylformamide, α-butyrolactone, ε-caprolactam, ethylene carbonate, sulfolane, and the like, also promotes a favorable course of the reaction. It is also possible to add metered amounts of $H_3PO_3$ to the heated solution of polyacrylonitrile (PAN), at corresponding rates, or to continuously react product streams of PAN and $H_3PO_3$ in a hot reaction zone after blending the streams.

The reaction product can be worked up by conventional comminution of the solidified melt and repeatedly washing the phosphorous acid out with water. It is surprisingly also possible to dissolve the reaction mixture consisting of PAN-polyphosphonic acid and excess phosphorous acid with a very small amount of water. In this case, 10-50 ml of water is added per mole of excess phosphorous acid. Subsequently, the product is precipitated by dilution with an excess of water, the phosphorous acid remaining in solution to the largest part and thus lending itself to ready separation. The product can be suspended once or twice at temperatures of 50°–100° C. in 0.2–1 l of water/100 g product to eliminate residues of not bound $H_3PO_3$.

After drying, the polyacrylonitrilepolyphosphonic acid is obtained as a yellowish solid, having a phosphorus content of 1–17%, preferably 5–17%. Especially preferred are polyphosphonic acids of polyacrylonitrile having a phosphorous content of 15–16.5%. The nitrogen content of the products is generally 4–16% by weight, preferably 6.5–7.5% by weight.

The polyacrylonitrilepolyphosphonic acids are hardly soluble in water, but readily soluble in aqueous bases (e.g., KOH, NaOH, $NH_4OH$, $Ca(OH)_2$, $Ba(OH)_2$, watersoluble, amins, pyridine). The salts of the polyphosphonic acids can be obtained by reaction in water with bases or metallic oxides; at the same time, a portion of the nitrile groups can be saponified to amide or carboxy groups. The sodium, potassium, and ammonium salts of polyacrylonitrilepolyphosphonic acid are soluble in water.

The addition products of phosphorous acid to polycarylonitrile according to this invention are highly suitable as flame retardant additives to synthetic resins, requiring no other such additives, due to their phosphorus and nitrogen contents. The polyacrylonitrilepolyphosphonic acids are generally used in amounts of 3–30% by weight, based on the total weight of the synthetic resin blend. Furthermore, a special advantage resides in a reduction in the tendency of the resultant blend to form burning drippings of the polymers.

Preferred synthetic resins for treatment with polyacrylonitrilepolyphosphonic acid include: polyolefins, e.g., polypropylene, polyesters, especially polybutylene terephthalate and polyethylene terephthalate, polyamides, polystyrene, polyurethanes, polyepoxide resins, cellulose polymers, acrylonitrile polymers, and the like.

An especially effective flame retardance is obtained by combining the PAN-$H_3PO_3$ addition product with melamine or nitrogen-rich compounds, (e.g. 20–80, preferably 40–80 wt. % N) such as, for example, urea, dicyandiamide, guanylurea, etc. or with nitrogen-containing polymers, such as melamine-formaldehyde resin, polyurethane, polyamide, etc. Also suitable for the blends are the salts of melamine, such as, for example, melamine cyanurate, melamine oxalate, melamine phosphate, etc. The ratio of polyphosphonic acid of this invention to nitrogen compound is usually from 1:0.2 to 1:5, preferably 1:0.4–1:2 and particulary 1:0,4–1:0.8. Combinations with melamine, melamine-formaldehyde resin, or melamine cyanurate are preferred, wherein the weight ratio of polyphosphonic acid to nitrogen compound is preferably 1:0.2 to 1:5, particularly 1:0.5 to 1:2. Such mixtures of PAN-polyphosphonic acid and melamine derivatives are of great efficacy as intumescent flame retardants in synthetic resins, preferably in polyolefins, especially in polypropylene, and are hardly extracted by water.

The addition of compounds rich in hydroxy groups such as, for example, starch, pentaerythritol, cellulose, sugars, etc. can contribute toward promoting a coke layer during exposure to fire and can improve flame retardance. The ratio of polyphosphonic acid compounds of this invention to hydroxy-containing compounds is usually 1:0.1–1:1, preferably 1:0.2–1:0.4.

The concentration of PAN-polyphosphonic acid in polypropylene mixtures is usually 3–30% by weight, preferably 15–25% by weight. The total concentration of the flame retardant additives in polypropylene depending on the degree of flame retardance desired, is usually 5 to 60% by weight, preferably 20 to 40% by weight. Especially preferred is a polypropylene composition containing 30–37% by weight of a mixture of PAN-polyphosphonic acid/melamine/pentaerythritol in a weight ratio of 1:0.4:0.2 to 1:0.8:0.4 and having a LOI [=oxygen index] of 29–30.

Another preferred field of use of the flame retardants of this invention is in the treatment of linear polyesters, such as polyethylene terephthalate and polybutylene terephthalate, and of polyamides, such as polyamide-6.6, polyamide-11, or polyaurolactam (polyamide-12). The concentration of the PAN-polyphosphonic acid in these polycondensates is usually 3–30% by weight, preferably 5–15% by weight. As mentioned, by the addition of melamine, melamine cyanurate, melamine oxalate, or other nitrogen-rich compounds, flame retardance is enhanced.

The flame retardant thermoplastics can be manufactured according to fully conventional processes, e.g., by mixing and shaping in extruders, masticators, rolls, and presses above the softening temperature of the polymers. Use of the conventional auxiliary agents for synthetic resins or fillers, such as, for example, stabilizers, lubricants (mold release agents), colorants, pigments, plasticizers, glass fibers, chalk, talc, is also possible in addition to the flame retardant of this invention.

Another field of application is in the area of intumescent coating agents. The presently known systems are unsuitable for outside use due to lack of stability with respect to water. By using the PAN-polyphosphonic acid of this invention, intumescent flame retardant systems having high weatherability become available.

The compositions of such flame resistant coatings is analogous to the flame retardant compositions for synthetic resins described above. However, such coatings contain, besides the phosphorus component and optionally the nitrogen and hydroxy components, in fully conventional manner, a film-forming polymer, dissolved in organic solvents or dispersed in water, which serve as the binder. Examples of such paint resins are homo- or copolymers of vinyl acetate, acrylate, acrylonitrile, styrene, butadiene, vinyl chloride, vinylidene chloride, chloroprene, or resins based on phenol, urea, melamine, epoxides, or condensates, such as polyesters and polyurethanes, etc. Other known components of intumescent paints, of course, can also be used and include colorants, pigments, fillers, fibers, auxiliary thickeners, dispersants, wetting agents, chlorine compounds, and antistats.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

The oxygen index (LOI) according to ASTM D-2863 was utilized for testing the flame retardant properties of the synthetic resin mixtures of this invention. Small rods of the dimensions $150\times6\times3$ mm are disposed vertically in a glass cylinder with varying $N_2/O_2$ mixtures and ignited at the upper end. The $O_2$ concentration is determined at which the specimen burns longer than 3 minutes. A LOI equal to 20.9 means that the specimen, under a normal atmosphere, is just barely still burning, whereas it is extinguished at a lower $O_2$ content, for example 20.5% $O_2$.

The water resistance of the flame retardant mixtures was tested by stirring the rods for the burning test for a period of 10 days (8 hours per day) in hot water (90° C.) and then introducing the rods again into the LOI test.

In the UL 94 test, rods (125×12.7×3 mm) are ignited at the bottom end for 10 seconds with a 2 cm flame. The time until extinction of the specimen is determined by a stopwatch. Directly after extinction, the specimen is ignited a second time.

Evaluation:
NB: The specimens burn, on the average, longer than 25 seconds.
V2: The specimens are extinguished within 25 seconds, but burning droplets ignite a wad of cotton wool disposed 30.5 cm underneath the specimen.
V1: The specimens are extinguished within 25 seconds; the cotton wool is not ignited.
V0: The specimens are extinguished, on the average, within 5 seconds (maximally 10 seconds); the cotton wool is not ignited.

Testing of the intumescent coatings took place on wooden panels (100×100 mm) having a thickness of 1.5 mm and mounted horizontally above a gas flame having a length of 3 cm, so that the tip of the flame just reached the center of the coating. The time was measured by which the flame penetrated the surface of the panel.

I. Preparation of Polyacrylonitrilepolyphosphonic Acid

EXAMPLE 1

164 g of phosphorous acid (2 moles) is melted in a stirred vessel under $N_2$. At 180°–190° C., 53 g of polyacrylonitrile (molecular weight about 50,000) is added within 4 hours in small portions of about 2 g, waiting for an exothermic reaction after each addition. The viscous melt is further agitated for 2 hours at 190°–200° C. During cooling, the reaction mixture solidifies to a hard, yellow mass. The latter is comminuted in a mortar and leached out several times with water. After drying, 65.8 g of a light-yellow solid product is obtained.

Analysis: 36.05% C, 5.75% H, 7.1% N, 16.1% P.

EXAMPLE 2

In accordance with the description of Example 1, 90 g of polyacrylonitrile (copolymer with 6% methyl acrylate, MW 100,000, producer: Du Pont, USA, PAN, Type A 7) is added under nitrogen at 190° C. to 326 g of phosphorous acid (4 moles) and 1 g of aluminium chloride.

After termination of the reaction, the reaction mixture is diluted by dropwise addition of 100 ml of water at 160°–120° C. An almost clear solution is obtained which is precipitated in 3 l of cold water. The precipitation product is boiled twice with 1.5 l of water to free it from phosphorous acid. The residue is dried in a vacuum drying chamber at 120° C.

Product Yield: 141 g Phosphorus Content: 16.4%; Nitrogen Content: 6.9%

EXAMPLE 3

At 190° C., 26.5 g of polyacrylonitrile (MW 100,000) is added in small portions of about 2 g within 2 hours to a mixture of 98 g of phosphoric acid and 41 g of phosphorous acid. After completion of the exothermic reaction, heating is continued for about 2 hours. The mixture is combined dropwise with 25 ml of water at 160° C. and then stirred into 2 l of cold water. The thus-precipitated product is separated, repeatedly washed with water, and dried at 120° C.

Product Yield: 35 g Phosphorus Content: 9.4%

EXAMPLE 4

41 g of phosphorous acid is combined with 150 ml of sulfolane at 190° C. under $N_2$ and 13 g of polyacrylonitrile (MW 100,000) in 150 ml of sulfolane is added dropwise thereto within 4 hours. During the course of the reaction, a smeary solid is precipitated. The mixture is maintained for 2 hours at 190° C.; after cooling, the liquid is carefully decanted off the solid, and the latter is boiled repeatedly with water until a fine-floccular material is formed.

Product Yield: 8 g Phosphorus Content: 9.75%

More product can be obtained from the solvent by pouring the same into water.

II. Use of Polyacrylonitrilepolyphosphonic Acid as Flame Retardant

EXAMPLE 5

The components indicated in the table are thoroughly blended in a mill with polybutylene terephthalate powder and then pressed into plates in a heatable press at 230°–240° C., the plates having a thickness of 3 mm. The LOI value is determined on small rods (3×6×150 mm); for the UL 94 test, rods are produced by sawing (3×12.7×125 mm).

| Mixtures | No. 1 | 2 | 3 | 4 | 5 | 6 |
|---|---|---|---|---|---|---|
| Polybutylene Terephthalate | 100 | 90 | 90 | 80 | 80 | 75 |
| PAN-Polyphosphonic Acid (Example 2) | — | 10 | 7 | — | 20 | 10 |
| Melamine | — | — | 3 | — | — | — |
| Melamine Oxalate | — | — | — | 20 | — | 15 |
| Tests: LOI | 23.0 | 25.0 | 25.5 | 26.0 | 26.5 | 29.5 |
| UL 94 | NB | V 2 | V 2 | V 2 | V 2 | V 0 |

EXAMPLE 6

Analogously to Example 5, mixtures are produced from a polyamide-12 powder (polylaurolactam) with the disclosed flame retardant additives and subjected to the above-described tests.

| Mixtures | No. 1 | 2 | 3 | 4 | 5 | 6 | 7 | 8 |
|---|---|---|---|---|---|---|---|---|
| Polylaurolactam | 100 | 85 | 85 | 85 | 85 | 80 | 70 | 70 |
| PAN-Polyphosphonic Acid (Example 2) | — | — | 15 | 10 | 10 | 20 | — | 10 |
| 1-Aminoethane-1,1- | — | 10 | — | — | — | — | — | — |

-continued

| Mixtures | 1 | 2 | 3 | 4 | 5 | 6 | 7 | 8 |
|---|---|---|---|---|---|---|---|---|
| diphosphonic Acid | | | | | | | | |
| Melamine | — | 5 | — | 5 | — | — | — | — |
| Melamine Cyanurate | — | — | — | — | 5 | — | 30 | 20 |
| Tests: LOI | 22.5 | 23.0 | 25.0 | 25.5 | 26.0 | 26.0 | 27.5 | 27.5 |
| UL 94 | NB | NB | V 2 | V 2 | V 2 | V 2 | V 2 | V 0 |

Mixture No. 2 shows that a low-molecular phosphonic acid in polyamide-12 does not provide adequate flame retardance. Mixture No. 8 shows that a V 0 grade (i.e. self-extinguishing, no burning drippings) is attained with PAN-polyphosphonic acid.

EXAMPLE 7

The following mixtures were homogenized on a laboratory-type roll at 160°–190° C. and then pressed into 3 mm panels. The LOI test was used as the flammability criterion. Nos. 1, 3, and 5 are comparative measurements on the pure polymers.

| Mixtures | 1 | 2 | 3 | 4 | 5 | 6 |
|---|---|---|---|---|---|---|
| Polystyrene | 100 | 60 | — | — | — | — |
| Polyethylene | — | — | 100 | 60 | — | — |
| Polypropylene | — | — | — | — | 100 | 60 |
| PAN-Polyphosphonic Acid (Example 1) | — | 27 | — | 27 | — | 27 |
| Melamine | — | 13 | — | 13 | — | 13 |
| LOI | 18.0 | 22.5 | 17.5 | 25.0 | 17.5 | 31.0 |

EXAMPLE 8

The following polypropylene mixtures were produced on a laboratory-type roll at 190° C. and subjected to the LOI test (→LOI I). To test water resistance, the test rods were agitated in hot water of 90° C. for a period of 10 days (8 hours per day) and then again subjected to the LOI test (→LOI II).

| Mixtures | 1 | 2 | 3 | 4 | 5 | 6 |
|---|---|---|---|---|---|---|
| Polypropylene | 80 | 70 | 70 | 70 | 65 | 60 |
| PAN-Polyphosphonic Acid (Example 1) | 13 | 20 | — | — | 20 | 25 |
| Hydroxymethanephosphonic Acid | — | — | 20 | — | — | — |
| Ammonium Polyphosphate | — | — | — | 20 | — | — |
| Melamine | 7 | 10 | 10 | 10 | 10 | 10 |
| Pentaerythritol | — | — | — | — | 5 | 5 |
| LOI I | 25.5 | 27.0 | 29.0 | 23.0 | 29.5 | 32.0 |
| LOI II | 25.5 | 26.5 | 23.5 | 19.0 | 28.5 | 30.5 |

While mixtures Nos. 3 and 4 extensively lose their flame retardant properties by the water treatment, mixtures Nos. 1, 2, 5, and 6 (with PAN-polyphosphonic acid) show only a small reduction in flame retardant activity. Mixtures Nos. 5 and 6 are evaluated as being V 0 in the UL 94 test.

EXAMPLE 9

To test flame retardant effect and water resistance of polyacrylonitrilepolyphosphonic acid (Example 2) in intumescent paints, mixtures are prepared from 3 parts of a 50% solution of an alkyd resin ("Alkydal F 41") and one part flame retardant (see table), and applied to wooden plates having a thickness of 1.5 mm in three successive coatings, and then dried. As blind samples, wooden plates are provided only with three "Alkydal" coats. A part of the coated plates is stored for 10 days in agitated water having a temperature of 50° C. and then dried and compared with the original specimens in the above-described burn-through test.

The indicated burn-through times are averaged from three measurements:

| | | Mixtures: | | |
|---|---|---|---|---|
| Flame Retardant | Blind Specimen | No. 1 Comp. | No. 2 Comp. | No. 3 |
| Ammonium Polyphosphate | — | 30 | — | — |
| Aminoethanediphosphonic Acid | — | — | 30 | — |
| Polyacrylonitrile-polyphosphonic Acid | — | — | — | 30 |
| Melamine Formaldehyde Resin | — | 15 | 15 | 15 |
| Pentaerythritol | — | 7.5 | 7.5 | 7.5 |
| Burn-Through Time in Seconds (Without Water Treatment): | 33 | >180 | >180 | >180 |
| Burn-Through Time in Seconds (after Water Storage): | 39 | 96 | 121 | >180 |

Only mixture No. 3 according to this invention does not register a reduction in flame retardant effect after the water treatment.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a polyacrylonitrilepolyphosphonic acid of a phosphorous content of 1–17% by weight, comprising reacting a homo or copolymer of acrylonitrile of a molecular weight of 1,000–200,000, and containing at least about 20 mole of acrylonitrile monomer component, at a temperature of 120°–220° C., with 0.2–8 moles of phosphorous acid per mole of nitrile groups in the polymer, and, subsequently, removing any unreacted phosphorous acid from the reaction product by dissolution thereof in water.

2. A process of claim 1, wherein the amount of phosphorous acid is 2–4 moles per mole of nitrile groups.

3. A process of claim 1, wherein the reaction is conducted at 160°–190° C.

4. A process of claim 1, wherein the phosphorous acid is first heated to 120°–220° C., and then the acrylonitrile polymer is metered into the phosphorous acid.

5. A process of claim 4, wherein the temperature of the phosphorous acid is 160°–190° C.

6. A process of claim 1, comprising removing unreacted phosphorous acid by combining the reaction mixture of phosphorous acid and acrylonitrile polymer with 10–50 moles of water per mole of excess phosphorous acid and, subsequently, precipitating the polyacrylonitrilepolyphosphonic acid by metering the combination with water and said reaction mixture into an excess of water.

7. A process of claim 1 carried out in the presence of a reaction compatible solvent.

8. A process of claim 1, wherein a copolymer of acrylonitrile is reacted and the comonomer is acrylic acid, an acrylic acid ester, acrylamide, vinyl acetate, vinyl ether, styrene, butadiene, butene, vinyl chloride, or vinylidene chloride.

9. A process of claim 1, wherein the $H_3PO_3$ is anhydrous and has a melting point of 65°–70° C.

10. In a fire retardant synthetic resin composition comprising a fire retardant agent, the improvement wherein the fire retardant agent is 3–30% by weight, based on the total weight of the synthetic resin composition of a polyacrylonitrilepolyphosphonic acid produced by the process of claim 1.

11. A composition of claim 10 further comprising, as a co-fire retardant agent, melamine, melamine cyanurate or a melamine resin in a weight ratio of polyacrylonitrilepolyphosphonic acid to melamine compound of 1:0.2 to 1:5.

12. A composition of claim 10, wherein the synthetic resin is polypropylene.

13. A composition of claim 11, wherein the synthetic resin is polypropylene.

14. A composition of claim 10, wherein the synthetic resin is polybutylene terephthalate or polylaurolactam.

15. A composition of claim 11, wherein the synthetic resin is polybutylene terephthalate or polylaurolactam.

16. In a flame retardant intumescent coating comprising a fire retardant agent, the improvement wherein the fire retardant agent is 3–30% by weight, based on the total weight of the coating, of a polyacrylonitrilepolyphosphonic acid produced by the process of claim 1.

17. A composition of claim 10 further comprising, as a co-fire retardant agent, a nitrogen rich compound in a weight ratio of 1:0,2 to 1:5.

18. A polyacrylonitrilepolyphosphonic acid of a phosphorous content of 1–17% by weight, prepared by the process of claim 1.

19. A polyacrylonitrilepolyphosphonic acid of a phosphorous content of 1–17% by weight, prepared by the process of claim 6.

20. A polyacrylonitrilepolyphosphonic acid of a phosphorous content of 15–16.5% by weight, prepared by the process of claim 1.

* * * * *